(12) United States Patent
Jurisch et al.

(10) Patent No.: US 6,904,549 B2
(45) Date of Patent: Jun. 7, 2005

(54) METHOD FOR FAULT IDENTIFICATION IN AN ELECTRICAL RADIAL NETWORK, AN APPLICATION OF THE METHOD AND AN ARRANGEMENT FOR FAULT IDENTIFICATION IN AN ELECTRICAL RADIAL NETWORK

(75) Inventors: Andreas Jurisch, Schwante (DE); Michael Schwenke, Hoenow (DE)

(73) Assignee: Siemens Aktiengesellschaft, München (DE)

( * ) Notice: Subject to any disclaimer, the term of this patent is extended or adjusted under 35 U.S.C. 154(b) by 469 days.

(21) Appl. No.: 10/214,447

(22) Filed: Aug. 8, 2002

(65) Prior Publication Data

US 2004/0078710 A1 Apr. 22, 2004

(30) Foreign Application Priority Data

Aug. 9, 2001 (DE) .......................................... 101 39 318

(51) Int. Cl.⁷ .............................................. G01R 31/28
(52) U.S. Cl. ........................................ 714/712; 324/528
(58) Field of Search ............................. 361/63, 67, 47; 702/59, 58; 324/552, 528; 714/4, 112

(56) References Cited

U.S. PATENT DOCUMENTS

| | | | | |
|---|---|---|---|---|
| 4,996,624 A | * | 2/1991 | Schweitzer, III ............. 361/63 |
| 5,515,227 A | * | 5/1996 | Roberts et al. ............... 361/67 |
| 5,839,093 A | * | 11/1998 | Novosel et al. ............... 702/59 |
| 5,946,174 A | * | 8/1999 | Kaiser .......................... 361/47 |
| 6,420,876 B1 | * | 7/2002 | Saha et al. ................... 324/522 |
| 6,466,030 B2 | * | 10/2002 | Hu et al. ..................... 324/522 |
| 6,525,543 B1 | * | 2/2003 | Roberts et al. ............. 324/522 |
| 6,591,203 B1 | * | 7/2003 | Das et al. ..................... 702/58 |
| 6,625,745 B1 | * | 9/2003 | Johnson et al. ................. 714/4 |

FOREIGN PATENT DOCUMENTS

| | | |
|---|---|---|
| DE | 199 01 789 A1 | 7/2000 |
| EP | 0 554 553 A2 | 8/1993 |

OTHER PUBLICATIONS

"Schutztechnik in Elektroenergiesystemen" by Dr.–Ing. Heinz Clemens, et al., pp. 210–215.

* cited by examiner

*Primary Examiner*—David Ton
(74) *Attorney, Agent, or Firm*—Morrison & Foerster LLP (57) ABSTRACT

A Device for fault identification in an electrical radial network has a section cable and a number of outgoers which can be connected thereto. The device provides that a central control device uses fault direction signals and/or fault signals which are formed by outgoer protective devices which each monitor one of the outgoers to determine the position of the fault in the radial network and, if there is a fault on the section cable, for the central control device to initiate its disconnection.

17 Claims, 2 Drawing Sheets

METHOD FOR FAULT IDENTIFICATION IN AN ELECTRICAL RADIAL NETWORK, AN APPLICATION OF THE METHOD AND AN ARRANGEMENT FOR FAULT IDENTIFICATION IN AN ELECTRICAL RADIAL NETWORK

CLAIM FOR PRIORITY

This application claims priority to Application No. 10139318.0 which was published in the German language on Aug. 9, 2001.

TECHNICAL FIELD OF THE INVENTION

This invention relates to a method for fault identification in an electrical radial network having a section cable which can be disconnected and to which a number of outgoers can be connected.

BACKGROUND OF THE INVENTION

German Laid-Open Specification DE 199 01 789 A1 discloses a method for determining the direction of ground faults in a section of a magnetic levitation transport system. The magnetic levitation transport system is formed by an electrical radial network which has a section cable to which a number of outgoers can be connected. Each of the outgoers is connected at one end of a linear stator, which is in each case associated with a specific section of the magnetic levitation transport system. In order to activate a specific section of the magnetic levitation transport system, the appropriate outgoer is connected to the section cable via a switching point. The other end of the linear stator is connected to a reference potential. When a ground fault occurs, the ground fault direction is determined at the switching point for the outgoer that has been monitored by detecting the zero voltage which results from the phase voltages that are applied to that outgoer and, in a corresponding manner, by detecting the resultant zero current on the basis of the phase currents. The ground fault direction is determined on the basis of the zero voltage and of the zero current, with a fault direction signal being formed. Therefore, it is possible to decide whether the ground fault that has been found is on the outgoer that is being monitored (forward direction) or is not (backward direction). The method is in each case carried out separately for each of the outgoers, in order to monitor all the sections of the magnetic levitation transport system. The method is particularly suitable for variable-frequency operating voltages, such as those which occur, for example, during operation of magnetic levitation transport systems.

European Laid-Open Specification EP 0 554 553 A2 discloses a method and a system for disconnection of a faulty section of a power supply network. This document describes a power supply line which is connected to a substation and has a number of line sections which are connected in series via switches. An outgoer branches off from one of the line sections, and is likewise subdivided into two outgoer line sections, via a switch. Each of the switches has an associated so-called controller, by which the associated switch can be operated. The substation has an associated so-called main controller, which is connected to each of the controllers for data transmission. When a fault occurs in the power supply network, such a fault is first detected in the substation. This sends a stimulus signal to the main controller. The main controller then sends a fault determination request signal to all the controllers. In response to this fault determination request signal, each controller determines whether the fault is on the load side of the switch associated with it. In this case, each controller produces a result signal, which includes one of the two events YES=load-side fault or NO=not a load-side fault. Each controller then sends its result signal to every other controller and to the main controller. The result signals from all the controllers are thus available in each of the controllers. Each controller now uses the result signals autonomously to determine whether the switch associated with it is the one which is physically closest to the fault on the substation side. If this is the case, then the relevant controller autonomously trips the switch associated with it, so that the faulty part of the power supply network is disconnected. The main controller uses the result signals to which it has access to determine the faulty section, and passes the result to a display unit for display, or outputs the result to a printer.

SUMMARY OF THE INVENTION

According to an aspect of the invention, a method is provided by which a fault in a radial network is identified and disconnected safely, with little complexity.

According to an aspect of the invention, a method is provided for fault identification in an electrical radial network having a section cable which can be disconnected and to which a number of outgoers can be connected, which are each monitored by an associated outgoer protective device for the occurrence of a fault. Each outgoer protective device, which is associated with an outgoer which is connected to the section cable, transmits at least one fault direction signal to a central control device if the fault is on the section cable or is identified as being on this outgoer. At least one of the outgoer protective devices sends at least one fault signal to the central control device if the fault is on the section cable and all the outgoers are disconnected, the central control device uses the received fault signals and the received fault direction signals to determine that outgoer which has been identified to be faulty or to determine a fault on the section cable. If an outgoer is identified as being faulty, it is disconnected by the associated outgoer protective device or, in the event of a fault on the section cable, the central control device disconnects the section cable.

In the method according to the invention, the fault direction signals and the fault signals are sent to the central control device, which may be regarded as being at a higher level than the outgoer protective devices. The received fault direction signals and the received fault signals are used in the central control device to determine the position of the fault, determining whether the fault is on an outgoer or on the section cable. This determination is carried out only in the central control device. The method thus requires only a small amount of complexity. There is thus also no need to equip the outgoer protective devices for such a calculation as that which is to be carried out in the control device in order to determine the position of the fault. Depending on the position of the fault, disconnection takes place by an outgoer protective device, or initiated by the control device.

In the method according to the invention, a fault on the section cable is preferably detected by a section cable protective device which is initially blocked and is provided at the fed end of this section cable. The section cable protective device sends a fault identification signal to the central control device. When there is a fault on the section cable, the central control device sends a tripping signal to the blocked section cable protective device.

Since the section cable protective device is initially blocked, it does not immediately and autonomously initiate disconnection of the section cable, even if it has formed the fault identification signal. Disconnection of the section cable via the section cable protective device is initiated by the central control device, by the tripping signal. The tripping signal causes the section cable protective device to disconnect the section cable. Tripping or disconnection by the section cable protective device thus takes place with certainty only in the event of a fault on the section cable, since the control device also takes into account the status of the outgoer protective devices. The central control device thus provides coordination of the tripping of the section cable protective device, for selective disconnection of this fault. After tripping by the tripping signal from the control device, the section cable protective device is still blocked in terms of its autonomous tripping, or either switches itself to this state or is switched to this state by the central control device.

According to another aspect of the invention, a method is provided for fault identification in an electrical radial network having a section cable which is monitored by a section cable protective device, which is initially blocked, for the occurrence of a fault, and to which a number of outgoers can be connected, which are each monitored by an associated outgoer protective device for the occurrence of a fault. Each outgoer protective device which is associated with an outgoer which is connected to the section cable transmits at least one fault direction signal to a central control device if the fault is on the section cable or is identified as being on this outgoer. The section cable protective device sends a fault identification signal to the central control device, at least if the fault is on the section cable. The central control device blocks at least that section cable protective device which has sent a fault identification signal. The central control device uses the received fault identification signal and the received fault direction signals to determine that outgoer which has been identified to be faulty or to determine a fault on the section cable. If an outgoer is identified as being faulty, it is disconnected by the associated outgoer protective device. In the event of a fault on the section cable, the central control device sends a tripping signal to the blocked section cable protective device. This method is based from the start on using a section cable protective device to detect a fault on the section cable. None of the outgoer protective devices therefore need to be designed to form a fault signal and to send such a fault signal to the central control device when the associated outgoer is disconnected. In this method as well, the position of the fault is determined solely by the central control device, so that little complexity is required in this case.

According to a further aspect of the invention, following a stimulus to the section cable protective device which initiates the method, the section cable is disconnected after a first waiting period following the stimulus and, if the fault is still present, with its own blockade being cancelled. This improves the safety of the method since, in the event of a failure of the data transmission between the section cable protective device and the central control device, as a result of which a tripping signal is incorrectly passed, or is not passed at all, to the section cable protective device, this nevertheless allows disconnection of the section cable.

According to the aspects of the invention, the section cable is preferably fed by a converter, and the outgoer protective devices are likewise initially blocked; in this case, at least if the outgoer is faulty, the central control device drives the converter such that the electrical voltage which is applied to the section cable is regulated at zero, and then the central control device sends a tripping signal to the outgoer protective device which is associated with the faulty outgoer. This results in an outgoer which has been identified as being faulty being disconnected when no current is flowing, so that the switching devices required for this purpose are switched when no current is flowing. This means that the wear on these associated switching devices is reduced. The outgoer protective devices are initially blocked for this purpose, that is to say they cannot cause disconnection immediately and autonomously immediately after identification of a fault on the associated outgoer. The disconnection of the associated outgoer is initiated deliberately via the tripping signal from the central control device.

The invention preferably provides that following a stimulus which initiates the method according to the invention, each outgoer protective device trips after a second waiting period following the stimulus when a fault is identified on the associated outgoer, canceling its own blockade. This results in the same advantages as those which have already been explained above for tripping being carried out by the section cable protective device after a first waiting period.

The first waiting period is preferably longer than the second waiting period. Even in the event of a disturbance in the signal transmission between the central control device and the protective devices, this ensures that, in the event of a fault on one outgoer, only this outgoer is disconnected once again, and not the section cable with all the outgoers.

The two methods according to the invention are preferably used for a magnetic levitation transport system, in which each outgoer is connected to one end of a polyphase linear stator which is associated with a specific section of the magnetic levitation transport system, in which the appropriate outgoer for activation of one section is connected to the section cable, and the other end of the linear stator is connected in star. The expression "connected in star" with regard to the polyphase linear stator, that is to say a linear stator which has a number of phase windings, should be understood as referring to the short-circuiting of the phase windings.

The invention is preferably used in such a way that two linear stators which can be activated such that they are considered successively corresponding to the direction of travel of a magnetic levitation transport which is located on the magnetic levitation transport system, are connected to the section cable at the same time by connecting the appropriate outgoers, with only the first of the linear stators to be activated being connected to the reference potential. In this application, the actual linear stator which is to be driven over by the magnetic levitation transport vehicle, and the linear stator to be driven over after this are simultaneously monitored for a fault. In the case of the linear stator which is to be driven over later, there is, however, no connection to the reference potential, so that only the operating voltage which is present on the section cable, and not any operating current, is applied to it. In the event of a fault in this linear stator which is to be activated completely later, there is, however, also a current flow which can be detected via the outgoer protective device associated with the corresponding outgoer, and which can be used by this outgoer protective device to form a fault direction signal. In this application, any fault which may be present there can be detected even before complete activation of the linear stator which is to be driven over next.

The invention also relates to an arrangement for fault identification in an electrical radial network. An arrangement such as this is disclosed in European Laid-Open Specification EP 0 554 553 A2, which has already been cited above.

According to another aspect of the invention, an arrangement for fault identification in an electrical radial network is provided, which arrangement requires little complexity for reliable detection and disconnection of a fault on a faulty outgoer, or on the section cable.

According to this aspect of the invention, an arrangement is provided for fault identification in an electrical radial network with a section cable which can be disconnected and to which a number of outgoers can be connected, each of which has an associated outgoer protective device which is connected to a central control device for data transmission. Each outgoer protective device has means for detection of the fault direction in the event of a fault which is identified on the associated outgoer or, when the associated outgoer is connected, in the event of a fault occurring on the section cable, has means for sending a fault direction signal to the central control device, and has means for initiating disconnection of the associated outgoer. At least one of the outgoer protective devices has means for identification of a fault on the section cable when the associated outgoer is disconnected, and has means for sending a fault signal to the central control device. The central control device has means for determining the outgoer which is identified as being faulty, or determining a fault on the section cable on the basis of the received fault direction signals and received fault signals, and has means for initiating the disconnection of the section cable when there is a fault there. In the event of a fault on an outgoer, the arrangement allows this outgoer to be disconnected automatically by the associated outgoer protective device; in the event of a fault on the section cable, the central control device initiates the disconnection of the section cable. The arrangement allows a fault to be disconnected reliably and also selectively, that is to say, in the event of a fault on one outgoer, it is possible to disconnect only this faulty outgoer, separately. The arrangement for fault identification has a simple design since only the central control device has the means for determining the faulty outgoer or a fault on the section cable on the basis of the received fault direction signals and the received fault signals.

The fed end of the section cable preferably has an associated section cable protective device which is connected to the central control device, can be switched to a blocked state and has means for sending a fault identification signal to the central control device in the event of a fault on the section cable. The central control device has means for blocking at least that section cable protective device, and means for producing and sending a tripping signal to that protective device. The section cable protective device makes the arrangement for fault identification particularly reliable, since a fault on the section cable is also detected by the section cable protective device. The expression "a blocked state of the section cable protective device" means a state in which the section cable protective device cannot autonomously initiate disconnection of the section cable immediately after identification of a fault. Tripping by the section cable protective device can then be initiated externally, that is to say by the central control device, for example by the tripping signal. The section cable protective device can switch itself to the blocked state; however, it can just as well be switched to the blocked state by appropriate activation from the central control device. The control device initiates the disconnection of the section cable via the section cable protective device by the tripping signal only in the event of a fault on the section cable. The object relating to the arrangement for fault identification in an electrical radial network is also achieved, according to an aspect of the invention, by an arrangement for fault identification in an electrical radial network having a section cable whose fed end has an associated section cable protective device. The section cable can be connected to a number of outgoers, each of which has an associated outgoer protective device which is connected to a central control device for data transmission. The section cable protective device can be switched to a blocked state and has means for identification of at least one fault on the section cable, and means for sending a fault identification signal to the central control device. Each outgoer protective device has means for detecting the fault direction in the event of a fault occurring on the associated outgoer or in the event of a fault occurring on the section cable when the associated outgoer is connected, and has means for sending a fault direction signal to the central control device. The central control device has means for blocking at least the section cable device. The central control device has means for determining the faulty outgoer or a fault on the section cable on the basis of the received fault direction signals and of the received fault identification signals. The central control device has means for forming and sending a tripping signal to the section cable protective device.

In this arrangement, the position of the fault is determined only in the central control device, that is to say whether the fault is on the section cable or on a connected outgoer. Only the central control device thus has appropriate means, as well. In order to allow selective disconnection to be carried out, disconnection of the section cable can be initiated deliberately by the control device via the initially blocked section cable protective device only when there is also a fault on the section cable. In the case of a fault which is identified as being on an outgoer, the section cable is not disconnected.

In one preferred aspect, the section cable protective device has a protection time stage, via which a first waiting period, which runs following a stimulus, is set in order to initiate the disconnection of the section cable when a fault is still present. This means that, as already described for the method above, the section cable is disconnected by the section cable protective device. The waiting period ensures that the correspondingly associated outgoer protective device can react first of all in the event of a fault of an outgoer; these trip without any time delay.

A converter which is connected to the fed end of the section cable is preferably provided, and the control device preferably has means which are connected to the converter for its actuation; the outgoer protective devices can be switched to a blocked state and the central control device has means for forming and sending a tripping signal to the outgoer protective devices. The converter which is provided for feeding the section cable can be driven deliberately by the control device such that, before initiating the disconnection of an outgoer by the associated outgoer protective device, this outgoer protective device can be blocked and the converter can be driven such that the voltage on the section cable is regulated at zero. The faulty outgoer can then be disconnected without any voltage applied, and thus without any current flowing, by sending a tripping signal to the corresponding blocked outgoer protective device. The load on the switching devices required for this purpose is thus extremely low. In the blocked state, the outgoer protective devices, analogous to the blocked state of the section cable protective devices, cannot autonomously initiate its disconnection immediately after identification of a fault. In fact, this may be done externally by the control device and/or only after a waiting time has elapsed, as described below.

Each outgoer protective device preferably has a tripping time stage, via which a second waiting time, which runs following a stimulus, for initiating the disconnection of the associated outgoer in the event of there being a fault there is set. This ensures that the faulty outgoer is disconnected even if there is a disturbance in the data communication between the central control device and the outgoer protective devices.

The first waiting period is preferably set to be longer than the second waiting time. This choice of the waiting periods allows selective disconnection in the form of time-staggered protection in the event of a disturbance in the data transmission and in the event of the protective devices not tripping themselves as a consequence. Thus, in the event of a fault of one outgoer, only the outgoer protective device which is associated with this faulty outgoer is disconnected, and not the section cable protective device.

The invention will be explained in more detail with reference to the drawings. Identical parts are provided with the same reference symbols in all the figures.

DETAILED DESCRIPTION OF THE PREFERRED EMBODIMENTS

Figure 1:
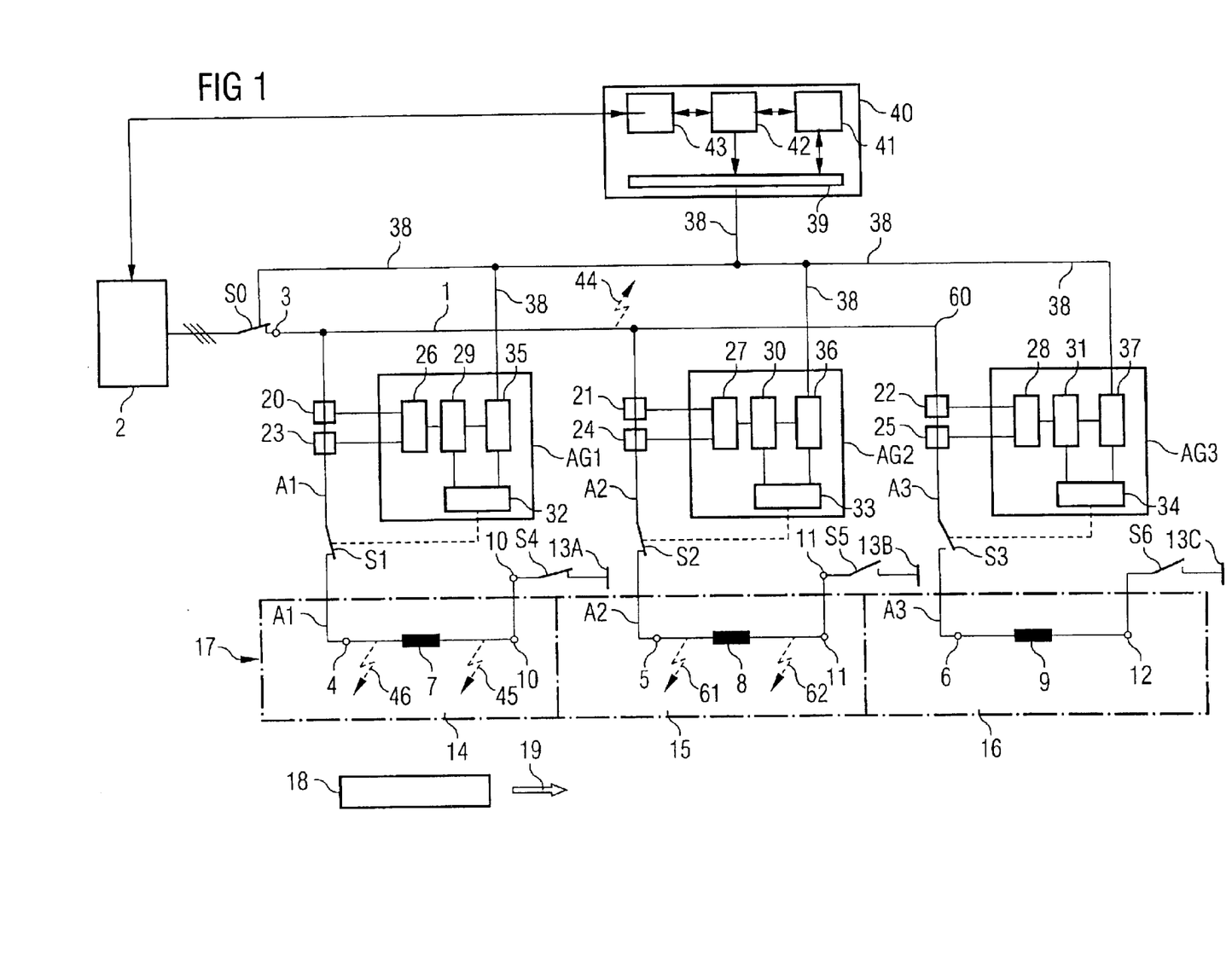
FIG. 1 shows an arrangement for fault identification in an electrical radial network.

FIG. 1 shows an arrangement for fault identification in an electrical radial network. The radial network has a section cable 1, which is fed at one end 3 via a converter 2. The section cable 1 is a three-phase cable and can be connected at its end 3 to the converter 2, and can be disconnected from this converter 2, via a switch S0. Three three-phase outgoers A1 to A3 can each be connected to the section cable 1 via a respective switch S1 to S3; one end 4, 5 or 6, respectively, of a linear stator 7, 8 or 9, respectively, can be electrically connected to the section cable 1 in this way via each of the switches S1 to S3. Each linear stator 7 to 9 has three respective phase windings, which are not illustrated in any more detail. The switches S1 to S3 are three-phase switches, which means that all three phases of the respective outgoer A1 to A3 are switched via each of the switches S1 to S3, so that each phase of the corresponding outgoer A1 to A3 can be connected to a respective phase winding of the respective linear stator 7 to 9. The respective other ends 10, 11 and 12 of the linear stators 7, 8 and 9 can each be connected in star, via a respective switch S4, S5 and S6. The switches S4 to S6 for this purpose are also all three-phase switches; these allow the phase windings, which are not shown in any more detail, of the linear stators 7 to 9 to be short-circuited, "connected in star". Each of the linear stators 7 to 9 forms a respective section 14, 15 or 16 of a magnetic levitation transport system 17.

During operation of the magnetic levitation transport system, a schematically indicated magnetic levitation transport vehicle 18 is conveyed in the direction of travel 19 as indicated by the arrow. For this purpose, the individual sections 14 to 16 of the magnetic levitation transport system 17 are activated successively in time such that the linear stator 7, 8 or 9 which is associated with the respective section 14, 15 or 16 is connected at one of its ends 4, 5 or 6, respectively, via the corresponding respective switch S1, S2 or S3 to the section cable 1. The corresponding respective outgoer A1, A2 or A3 is thus connected to the section cable 1. In addition to the activation of a section 14, 15 or 16, the respective corresponding switch S4, S5 or S6 is switched on, so that the respective other end 10, 11 or 12 of the respective linear stator 7, 8 or 9 is connected in star, in each case forming a star point 13A, 13B, 13C. In order to carry out this activation and to switch the switches S1 to S6 on and off appropriately, an activation arrangement is provided, which is not shown in any more detail but by which the switches S1 to S6 are driven appropriately and the switching operations which can then be carried out are coordinated appropriately in time. This object can also be carried out by a central control device, although this will not be described until later. The speed of the magnetic levitation transport vehicle 18 is varied by the converter 2 varying the operating frequency of the operating voltage which is fed into the section cable 1 from the converter 2. The operating frequency is typically set by the converter 2 in a range from 0 Hertz to approximately 500 Hz.

In order to identify a fault in the electrical radial network, which is formed from the section cable 1 and the outgoers A1 to A3, each of the outgoers A1 to A3 is monitored for the occurrence of a fault by an associated outgoer protective device AG1 to AG3. Each of the outgoer protective devices AG1 to AG3 is for this purpose connected to corresponding voltage transformers 20, 21 and 22, respectively, for detecting the phase voltages and to current transformers 23, 24 and 25, respectively, for detecting the phase currents; the voltage transformers 20, 21 and 22, respectively, and the current transformers 23, 24, 25 are each arranged between the section cable 1 and the respective switches S1, S2 and S3. The voltage transformers 21 and 22 and the current transformers 23, 24 and 25 may also be arranged respectively between the switch 52 or 53 and the linear stator B or 9. This does not apply to the voltage transformer 20 since it is also intended to be able to detect the phase voltages which occur on the outgoer A1 when the switch S1 is open. This will also be described later.

The variables which are detected by the voltage and current transformers 20, 23; 21, 24 and 22, 25, respectively, are passed to a respective measurement stage 26, 27 or 28 of the respective outgoer protective device AG1, AG2 or AG3. Each measurement stage 26, 27 or 28 is connected to a respective data processing unit 29, 30 or 31 of the respective corresponding outgoer protective device AG1 to AG3. The direction of any fault which occurs can be detected with respect to the respective detection location of the phase voltages and currents and installation location of the transformers 20, 23; 21, 24; 22, 25 by each data processing unit 29, 30 or 31, respectively, based on the measurement variables supplied from the respective measurement state 26, 27 or 28. The zero voltage, that is to say the vectorial sum of all the phase voltages, and the zero current, that is to say the vectorial sum of all the phase currents, are normally used for this purpose. The voltage transformers 20 to 22 and the current transformers 23–25 may also be designed such that they each emit the corresponding zero voltage or the corresponding zero current to the respective measurement stage 26–28. Each of the data processing units 29, 30 or 31 is designed to form a fault direction signal, which indicates the fault direction, when a fault occurs on the section cable or when it has identified a fault on the associated outgoer A1, A2 or A3. In this case, a distinction must be drawn between a fault direction signal which indicates a forward fault, that is to say a fault on the respective outgoer A1, A2 or A3, and a fault direction signal which indicates a backward direction, that is to say a fault in the direction of the section cable 1. All known methods, for example as described in H. Clemens/K. Rothe "Schutztechnik in Elektroenergiesystemen" [Protection technology in electrical power systems], 3rd edition 1991, pages 210 to 215, may be used for identification of a fault and for determining the fault direction. The method according to DE 199 01 789 may be used, in particular, for determining the fault direction in a radial network which is provided, as in the present case, for a magnetic levitation transport system 17.

In order to identify a fault, for example by the data processing unit 29 of the outgoer protective device AG1, the phase voltage which is present on the outgoer A1 must include a fault voltage component of a detectable order of magnitude; its presence then indicates the fault. However, alternatively or additionally, a fault current component, which is caused by the fault, in the phase currents which flow in the outgoer A1 may also be used to identify a fault, and must likewise be of an order of magnitude which can be detected by instrumentation. In order to form a fault direction signal, both the fault voltage component and the fault current component must be detectable by the appropriate outgoer protective devices AG1, AG2 or AG3. For example, the outgoer protective device AG1 can detect a fault current component and a fault voltage component when the switch S1 for the outgoer A1 is closed, that is to say this switch S1 is connected to the section cable, and a fault occurs on the section cable 1, for example at the point annotated 44; this is also the case in the event of a fault which occurs on the outgoer A1 upstream of the linear stator 7, for example at the point annotated 46, or in the case of a fault which occurs within an area which extends from one end 4 into the linear stator 7, as far as 85% of its length (85% fault). If the fault is located closer to the other end 10 or to the star point 13A, for example at the point annotated 45 (100% fault), then this fault can be identified at least when the voltage which is present on the section cable 1 or on the outgoer A1 contains components which form a zero system. This is the case whenever the magnetic levitation transport vehicle 18 on the magnetic levitation transport system 17 is located on the section 14 with the linear stator 7. The rotor, not shown, of the magnetic levitation transport vehicle 18 then induces corresponding zero system components, which are in an order of magnitude which can be evaluated, as it moves over the linear stator. It is likewise possible for the converter 2 to feed in voltages and/or currents which contain zero-system-forming components as a result of the conversion process.

However, in this case, no phase current or zero current, and hence no component caused by any fault either, can be detected in the outgoers A1 to A3, if the respectively associated switch S1, S2 or S3 is open. In this case, it is thus not possible to determine any fault direction by means of the outgoer protective device associated with a disconnected outgoer, either.

The only important factor for the method according to the invention is that each of the outgoer protective devices AG1 to AG3 can form a fault direction signal if the fault is on the section cable 1 or if it has identified a fault on the associated outgoer A1, A2 or A3.

In order to make it possible to identify a fault on the section cable 1, using the method according to the invention as explained further below, even when all the switches S1 to S3 are open, at least one outgoer protective device AG1 is designed such that its data processing unit 29 detects a fault just on the basis of the fault voltage component in the absence of any detectable fault current component, and then forms at least one fault signal which indicates a fault. The voltage transformer 20 which is connected to this outgoer protective device AG1 must then, as already mentioned above, always be arranged between the section cable 1 and the switch S1. The other outgoer protective devices AG2 and AG3 may likewise be designed to form a fault signal such as this. The voltage transformers 21 and 22 must then likewise be arranged in a corresponding manner to the transformer 20.

Each of the outgoer protective devices AG1 to AG3 also has a tripping stage 32, 33 and 34, respectively, to which a switching signal is supplied from the respective data processing unit 29, 30 or 31 when a fault has been identified in the forward direction. The tripping stage 32, 33 or 34 is connected to the respective switch S1, S2 or S3 of the associated outgoer A1, A2, A3 in order to drive it. The switching signal results in the corresponding switch S1, S2 or S3 being opened, and hence a disconnection of the faulty outgoer A1, A2 or A3, respectively, via the respective tripping stage 32, 33 or 34.

Each of the outgoer protective devices AG1, AG2 or AG3 is connected via a respective transmitting/receiving stage 35, 36 or 37 and via a data bus 38 to a transmitting and receiving stage 39, which forms the opposing end in a corresponding manner, of a central control device 40. Each of the transmitting/receiving stages 35 to 37 is connected to the respectively associated data processing unit 29, 30 or 31 and is used for sending the respective fault direction signal, or fault signal, formed by this unit via the data bus 38 to the central control device 40.

The central control device 40 has a data processing device 41, which is connected to the transmitting/receiving stage 39 and is connected to a tripping unit 42. This is likewise connected to the transmitting/receiving stage 39. The data processing device 41 can use the received fault signals and/or fault direction signals to determine the position of a fault, that is to say it is possible to determine whether the fault is located on one of the outgoers AG1, AG2 or AG3, or on the section cable 1. If the fault is located on the section cable 1, the tripping unit 42 initiates disconnection of the section cable 1, that is to say opening of the switch S0. To do this, an appropriate disconnection signal is transmitted to the switch S0 via the transmitting/receiving stage 39 and via the data bus 38. The central control device 40 also has a control unit 43, which is connected firstly to the tripping stage 42 and secondly to the converter 2. The control unit 43 is used for driving the converter 2; this will be described in more detail later.

The method for fault identification will be explained in the following text on the basis of different situations for possible fault locations. In this case, one basic assumption is that each fault direction signal and fault signal which is received by the central control device 40 from the outgoer protective devices AG1 to AG3 can also be associated with the respective sending outgoer protective device AG1 to AG3. This can be ensured, for example, by each fault direction signal and each fault signal containing a coding, by which the respective sending outgoer protective device AG1 to AG3 is uniquely identified.

First case: the switches S1 to S3 are open, which means that all the outgoers A1 to A3 are disconnected. There is then no phase current in any of the outgoers A1 to A3; in the event of a fault, none of the outgoer protective devices AG1 to AG3 can thus form a fault direction signal. If, by way of example, a fault now occurs on the section cable 1 at the point annotated by the reference number 44, for example a ground fault, although none of the outgoer protective devices AG1 to AG3 can determine a fault direction signal, the data processing unit 29 of the outgoer protective device AG1 forms a fault signal, however, as already described above, which it sends to the central control device 40. The fact that there are no fault direction signals and the control device 40 has received only the fault signal from the outgoer protective device AG1 clearly confirms that the fault must be on the section cable 1.

This is also determined in a corresponding manner by the data processing device 41 for the central control device 40, which passes on a corresponding result signal to its tripping unit 42. This sends a switching signal to the switch S0, in order by opening the switch S0 to initiate the disconnection of the section cable 1. If a further outgoer protective device, for example the outgoer protective device AG2, were also designed such that it likewise forms a corresponding fault signal and sends this to the central control device, then this additional fault signal merely forms redundant information, which is not required by the data processing device 41 in order to confirm the position of the fault.

Second case, variant A: the switch S1 is switched on, and the switches S2, S3 and S4 are switched off. Although the switch S4 is not switched on, a phase current which can be detected by the current transformer 23 and which flows as a reactive current is formed on the outgoer A1. The data processing unit 29 for the outgoer protective device AG1 can accordingly form a fault direction signal when a fault occurs on the section cable 1 or when the fault occurs on the outgoer A1 in the conditions already described further above, and a fault current and a fault voltage can be detected. In the present case, the fault is once again assumed to be at the fault point annotated 44. The outgoer protective device AG1 then identifies the fault, and sends a fault direction signal, with backward fault as the content, to the central control device 40. Neither of the two outgoer protective devices AG2 or AG3 produces a fault direction signal. The outgoer protective device AG1 can, in addition, still produce the fault signal and send it to the central control device 40. Whenever the central control device 40 receives exclusively fault direction signals which indicate a backward fault, the fault must be located on the section cable 1. The data processing device 41 thus confirms, for the variant A, that the single fault direction signal indicates a backward fault, so that the fault is accordingly located on the section cable 1. If a fault signal is present, this need not be taken into account in the detection of the position of the fault. As already described in case 1, the central control device 40 initiates the disconnection of the section cable 1.

Second case, variant B: in contrast to variant A, the switch S4 is also switched on in this case, that is to say the outgoer A1 is completely activated, but apart from this this case corresponds to that already described for variant A.

Second case, variant C: the switches S1, S2, S4, S5 are switched on. The two outgoers A1 and A2 are thus completely activated. The switch S3 is open. A fault occurs on the section cable 1 at the location annotated 44. The two data processing units 29 and 30 for the outgoer protective devices AG1 and AG2 each identify the fault, each produce a fault direction signal whose content is backward fault, and send this via the corresponding transmitting/receiving stages 35 or 36 to the central control device 40. Its data processing device 41 identifies that all the received fault direction signals indicate a backward fault, and the fault must be located on the section cable 1. As also described in case 1, the control device 40 accordingly initiates the disconnection of the section cable 1. It should also be mentioned here that the outgoer protective device AG1 can admittedly produce a fault signal as also described in case 1 and can send it to the central control device 40; however, there is no need for the data processing device 41 to take this fault signal into account in order to determine the position of the fault. This variant C is generally not used for a magnetic levitation transport system; one possible application is for parallel operation of a number of synchronous machines from one converter. A synchronous machine would then be provided in each case in FIG. 1, instead of each of the linear stators 7–9.

Third case: this case relates to all variants, in which a fault occurs on a connected outgoer A1 to A3 and is identified by the appropriate outgoer protective device. In the event of a fault such as this, the associated outgoer protective device always produces a fault direction signal whose contents are forward fault. This on its own allows the control device 40 to determine that the fault is located on the outgoer which is associated with that outgoer protective device which has sent the corresponding fault direction signal. In this case as well, with all the variants, there is no need to take into account any fault signal which may be present or any other fault direction signals which indicate a backward fault, in order to determine the position of the fault.

Third case, variant A: the switch S1 is closed and the switches S2 and S3 are open. The switch position of the switch S4 is irrelevant. A fault now occurs on the outgoer A1, for example at the fault location annotated 46. The data processing unit 29 for the outgoer protective device AG1 then produces a fault direction signal whose contents are forward faults; the outgoer protective devices AG2 and AG3 do not produce any fault direction signal. The central control device 40 can use the fault direction signal from the outgoer protective device AG1 (forward fault) to unambiguously deduce that there is a fault on the outgoer A1, so that there is no need to switch the switch S0. The outgoer protective device AG1 causes the switch S1 to open, via the tripping stage 32. If the fault is at the point annotated 46, then it is possible that the fault will not be identified by any of the outgoer protective devices AG1 to AG3, since no fault current and/or fault voltage can be detected. However, at the latest when the magnetic levitation transport vehicle 18 moves into the section 14 with the linear stator 7, the fault can be identified at least by the outgoer protective device AG1, with a fault direction signal being formed by it.

Third case, variant B: the switches S1, S2 and S4 are switched on, and the switch S3 and the switch S5 are open. This application represents a so-called leading voltage test. The section 15 of the magnetic levitation transport system 17 which the magnetic levitation system vehicle 18 is moving over in the direction of travel 19, which is considered to be after the section 14, is not yet completely activated, that is to say the switch S5 which connects the second end 11 of the linear stator 8 in star, that is to say forming the star point 13B, is open. However, the section 15, that is to say the linear stator 8, is live, since the switch S2 is closed. This type of connection of the section 15 is used in order to test the linear stator 8 for a fault before the magnetic levitation transport vehicle 18 moves onto it. If, by way of example, a fault occurs on the outgoer A2 at the location annotated 61 in this case, then the outgoer protective device AG2 sends a fault direction signal, whose contents are forward faults, to the central control device 40. The central control device uses this fault direction signal to unambiguously identify the location of the fault, namely on the outgoer A2. The outgoer protective device 2 uses its tripping stage 33 to initiate disconnection of the outgoer A2, that is to say opening of the switch S2. The central control device 40 does not cause the switch S0 to open. In the event of a fault at the point annotated 62, the statements that have already been made with regard to the third case, variant A, for a fault at the point 45 apply in a corresponding manner and in the same sense to the outgoer protective device AG2.

Overall, the control device 40 can thus identify the position of the fault and, in the event of a fault on the section cable 1, can initiate disconnection of the section cable 1.

However, the method may also be modified such that disconnection of the outgoers A1, A2 or A3 in the event of a fault is also actuated or initiated by the central control device 40 and is not in each case initiated by the outgoer protective devices AG1 to AG3 themselves. The outgoer protective devices AG1–AG3 are in this case each in a state such that they are initially blocked. This means that they do not immediately and autonomously initiate disconnection of the respectively associated outgoer A1 to A3, even if they have identified a fault on the associated outgoer A1 to A3. In fact, the position of the fault is first of all determined by the central control device 40 on the basis of the received fault signals and/or fault direction signals. The central control device 40 can then initiate the disconnection of the fault by causing the switch S0 to be opened in the event of a fault on the section cable 1, as described in the first case, in order to disconnect the section cable 1. However, if a fault has been identified on the outgoer A1, as described in the third case, variant A, then the tripping unit 42 of the central control device 40 produces a tripping signal, which is transmitted via the transmitting/receiving stage 39 and the data bus 38 to the outgoer protective device AG1 or to its transmitting/receiving stage 35, which passes on the tripping signal to the tripping stage 32, which then causes the switch S1 to open.

This procedure offers, in particular, the advantage that, before a tripping signal is sent in order to disconnect a faulty outgoer A1 to A3, controlled via the control unit 43 of the central control device 40, the converter 2 can be actuated such that the phase voltages which are present on the section cable 1, and hence also the phase currents, can be regulated at zero. The control device 40 does not initiate disconnection of the outgoer A1 by the tripping signal until after this has been done, so that the switch S1 can be switched without any voltage being applied and without any current flowing. The switch S1 is thus protected, so that wear to it is low.

This procedure is particularly advantageous for the magnetic levitation transport system 17, since the switches S1 to S6 are frequently switched on and off successively in time during normal operation of this system, in order to activate the individual sections 14 to 16, and to switch them off, successively; the switches S1 to S6 are thus intrinsically loaded to a major extent by the frequent switching during normal operation of the magnetic levitation transport system 17.

Figure 2:
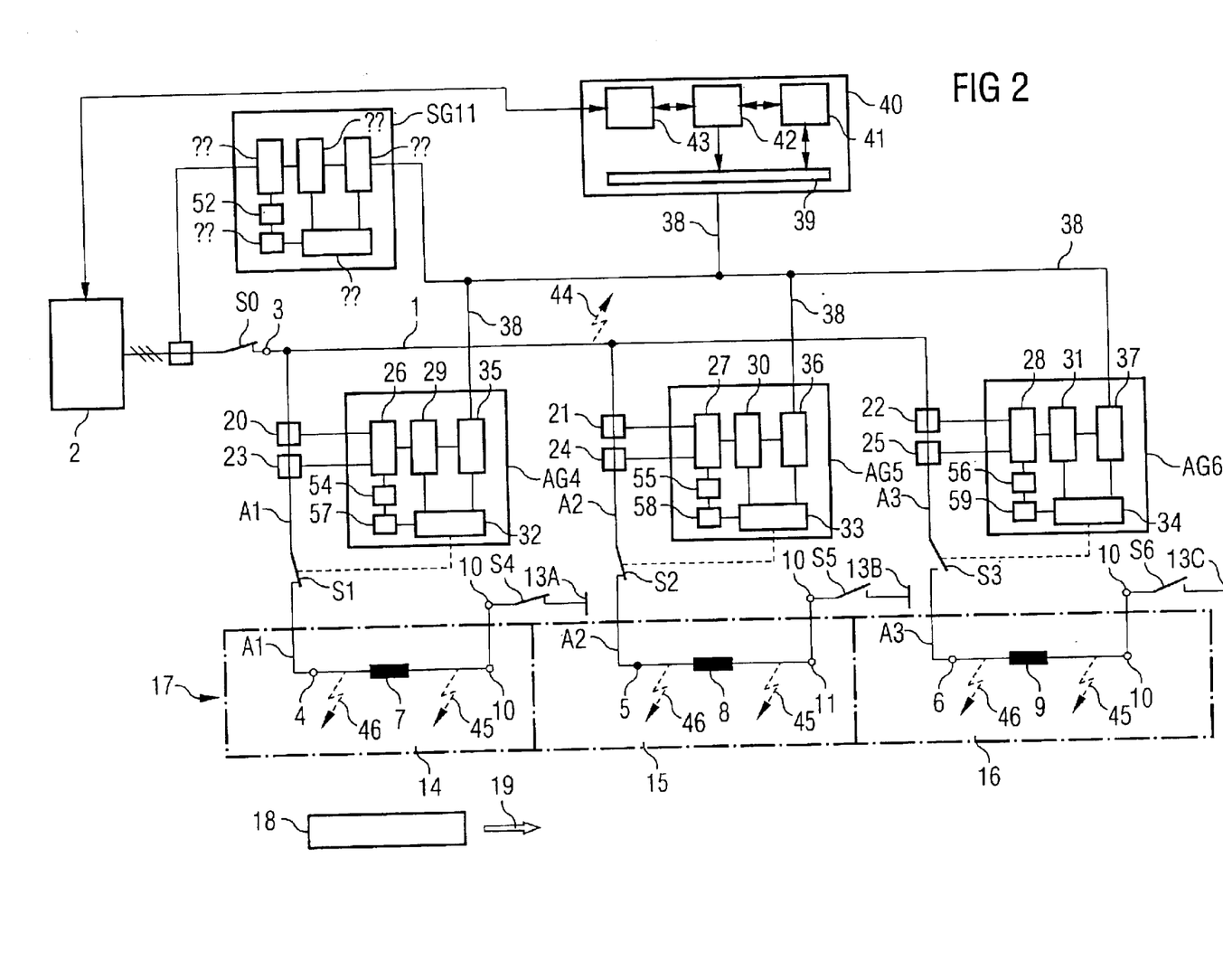
FIG. 2 shows a further arrangement for fault identification.

The arrangement for fault identification as illustrated in FIG. 2 differs from the arrangement illustrated in FIG. 1 in that a section cable protective device SG1 is also provided. As in the case of the arrangement shown in FIG. 1, the switch S0 can be actuated via the central control device 40, or else additionally via the section cable protective device SG1.

The section cable protective device SG1 has a measurement stage 48, which is connected to a transformer 47 by which voltage measurement values are detected, which correspond to the phase voltages that are present on the section cable 1. The measurement stage is connected to a data processing unit 49, which uses the measurement data supplied from the measurement stage 48 to determine the presence of a fault in the radial network, but at least on the section cable. The zero voltage may also be monitored in this case. If a fault is identified, the data processing unit 49 produces a fault identification signal which it passes to a transmitting/receiving stage 50 of the section cable protective device SG1, which is connected via the data bus 38 to the transmitting/receiving stage 39 of the central control device. The fault identification signal from the protective device SG1 is sent to the central control device. The section cable protective device SG1 also has a tripping stage 51, which is connected to the switch S0 in order to actuate it. The tripping stage 51 is connected to the data processing unit 49 and to the transmitting/receiving stage 50. The section cable protective device SG1 also has a starting stage 52, which on the one hand is connected to the measurement stage 58 and is followed on the output side by a protection time stage 53, which is in turn connected on its output side to the tripping stage 51. The starting stage 53 uses the measurement data supplied from the associated measurement stage 48 just to check whether there is any discrepancy between the phase voltages and/or phase currents and the normal values, such that a fault could be present in the section cable network; this corresponds to a starting stage as is generally known from protection technology.

As a further difference from the arrangement shown in FIG. 1, there is no need for one of the outgoer protective devices AG4 to AG6 to produce a fault signal when there is a fault on the section cable 1 and the associated outgoer is disconnected, and for this to be sent to the central control device 40 as is done by the outgoer protective device AG1 in the arrangement shown in FIG. 1. Thus, in the case of the arrangement shown in FIG. 2, the voltage transformer 20 may also be arranged between the switch S1 and the linear stator 7.

The method which is carried out by the arrangement shown in FIG. 2 will be explained using the cases considered with reference to FIG. 1. In this case, the description will essentially cover the differences from the method already described with reference to FIG. 1; otherwise, the description given there applies in the same sense to the method carried out using the arrangement as shown in FIG. 2, but with the designations A4, A5 and A6 being read in a corresponding manner, instead of the designations AG1, AG2, AG3. In all these cases, the section cable protective device SG1 is switched to a state in which, after identification of a fault, it does not immediately and autonomously initiate disconnection of the section cable, that is to say operation of the switch S0. Any switching operation on the switch S0 is initiated either via the central control device 40 or, as described further below, via the starting stage 52 and the protection time stage 53.

In the first case, the fault is detected by the additionally provided section cable protective device SG1, via its measurement stage 48 and the data processing unit 49, and a fault identification signal is sent via this transmitting/receiving stage 50 and the data bus 48 to the central control device 40. The section cable protective device SG1 does not initially initiate tripping. The data processing device 41 uses the fact that the fault identification signal from the section cable protective device SG1 is present and the fact that there is not a single fault direction signal, to identify that there can be only one fault on the section cable 1. The data processing device 41 passes this result to the tripping stage 42, which produces a tripping signal which is passed via the transmitting/receiving stage 39 and the data bus 38, and via the transmitting/receiving stage 50 of the section cable protective device SG1, to its tripping stage 51; the latter then causes the switch S0 to open, that is to say it disconnects the section cable 1.

In the second case, variants A, B and C, the section cable protective device SG1 likewise identifies the fault and sends its fault identification signal to the central control device 40. Since the section cable protection device SG1 is in the blocked state, it does not autonomously initiate the opening of the switch S0. The outgoer protective device AG4 (variants A, B) or the outgoer protective devices AG4 and AG5 (variant C) each send fault direction signals to the central control device 40. This uses the fact that only fault direction signals exclusively with the backward fault contents are present in all the variants A, B, C to identify the fact that the fault must be on the section cable 1 and, as described above, initiates the disconnection of the section cable 1 via the section cable protective device SG1. The fault identification signal from the section cable protective device SG1 need not be taken into account when determining the position of the fault.

In the variants described in FIG. 1, third case, there is no need for the central control device 40 to evaluate the fault identification signal in order to confirm the position of the fault. The procedure is the same as that already described there. In this case, it is important that the section cable protective device SG1 is in the blocked state, since the section cable protective device SG1 can, in certain circumstances, also respond to a fault on one of the outgoers A1 to A3, and then also forms a fault identification signal which it sends to the central control device. This is associated with the location of the fault on the faulty outgoer. If, by way of example, the fault is located on the outgoer A1 upstream of the linear stator 7, looking into the outgoer from the switch S1, that is to say at the point annotated 46 or, looking from one end 4 of the linear stator, within the first 85% of the length of the linear stator (85% fault), then the phase voltage discrepancies which can be determined by the data processing unit 49 from the normal situation are so large that it is possible to deduce that there is a fault, and a fault identification signal is formed. However, if the fault on the outgoer A1 is located, looking from the switch S1, within the linear stator in the region between 85 and 100% of the length of the linear stator 7 (100% fault), for example at the point annotated 45, then the phase voltage discrepancies which can be determined by the data processing unit 49 from the normal situation are no longer sufficiently great to allow a fault to be identified reliably as well, since these faults are located too close to the star point 13, and the phase voltages are in any case intrinsically already very small. One problem is that, in the event of a fault upstream of the linear stator 7 or in the event of an 85% fault, the section cable protective device SG1 would normally immediately and autonomously initiate the disconnection of the section cable 1, and hence also of all the outgoers A1 to A3, by appropriate actuation of the switch S0. This is undesirable in the event of a fault on an outgoer, for example the outgoer A1, since the relevant faulty outgoer A1 can be switched off on its own. The section cable protective device SG1 is thus in the blocked state in order to prevent it from possibly causing tripping autonomously; as already described above, the central control device 40 initiates disconnection only when a fault is actually present on the section cable 1.

One special case occurs when the data communication via the data bus 38 does not take place correctly. In this case, the central control device 40 fails to initiate a switching operation of the switch S0. In order to avoid this situation, in which disconnection fails to occur in the event of a fault on the section cable 1, the invention provides that the section cable protective device SC1 has the starting stage 52 and the protection time stage 53 which follows it. The starting stage 52 uses the measurement data supplied from the measurement stage 48 for identification, that is to say in general the presence of a fault, and then starts the protection time stage 53 with a first waiting time T1. At the same time, the data processing unit 49 uses the measured values supplied from the measurement stage 48 to form a fault identification signal which it passes to the transmitting/receiving stage 50 for data transmission to the central control device 40; this process is unsuccessful, since the data communication does not take place correctly. The data processing unit 49 continuously determines whether the fault which it has identified is still present and applies the fault identification signal to the tripping stage 51 only for as long as this is true. Once the first waiting time T1 from the protection time stage 53 has elapsed, it passes a tripping signal to the starting stage 51. If a fault identification signal which has been supplied from the data processing signal 49 is still being applied to the tripping stage 51 at this time, that is to say a fault is still present, then the tripping stage 51 causes the switch S0 to open, in order to disconnect the section cable 1. The section cable protective device SG1 thus in this case autonomously ends its blocked state. In this context, it should be mentioned that the section cable protective device SG1 need not necessarily have the starting stage 52 and the protection time stage 53. These are possible only to improve reliability. The waiting time T1 is in this case of such a duration that, once it has elapsed, a fault which has occurred on one of the outgoers A1–A3 will have been disconnected well before this by the appropriate outgoer protective device AG4–AG6. This avoids the section cable protective device SG1 initiating disconnection of the entire section cable 1 when the section cable protective device SG1 has identified a fault in the radial network, but the fault is only on one of the outgoers, A1 to A3.

As illustrated in FIG. 1, the outgoer protective devices AG4 to AG6 may also initially be in a blocked state in a modified arrangement shown in FIG. 2, so that the central control device 40 can regulate the current in the section cable 1 and in the outgoers A1 to A3, as illustrated in FIG. 1, at zero before the faulty outgoer is disconnected. If the data communication via a data bus (38) is not taking place correctly, in order to avoid a situation in which the appropriate outgoer A1–A3 is not disconnected in the event of a fault on one of the outgoers A1 to A3 because no appropriate tripping signal has been transmitted from the central control device 40 to the appropriate outgoer protective device AG4, AG5 or AG6, respectively, each of the outgoer protective devices has a starting stage 54, 55 or 56, respectively, which is connected on the input side to the associated respective measurement stage 26, 27 or 28, and on the output side to a respective tripping time stage 57, 58 or 59. Each tripping time stage 57 to 59 is connected to the respective tripping stage 32, 33 or 34 associated with the respective outgoer protective device AG4 to AG6. The design and operation of the starting stages 54, 56 correspond to the design and operation of the starting stage 53.

Let us assume that a fault occurs at the point annotated 46 on the connected outgoer A1. The starting stage 54 for the outgoer protective device AG4 uses the measured values supplied from the measurement stage 26 to identify the fact that a fault is present, and then actuates the tripping time stage 57. This delays the passing on of the stimulus by a second waiting time T2. At the same time, the data processing unit 29 uses the measured values supplied from the measurement stage 26 to identify the fact that this is a forward fault, that is to say a fault within the outgoer A1, and produces the fault direction signal with the forward direction as the contents, which it passes to the transmitting/receiving stage 35 in order to send this to the control device 40. In addition, the data processing unit 29 continuously determines whether a forward fault has been identified; as long as this is the case, it applies the forward signal to the tripping stage 32. Once the second waiting time T2 has elapsed in the tripping time stage 57, it stimulates the tripping stage 32. If a forward signal which has been supplied from the data processing unit 29 is present at the tripping stage 32 at this time, then the tripping stage 32 causes the switch S1 to open in order to disconnect the fault on the outgoer A1. Thus, in this case, once the waiting time T2 has elapsed, the outgoer protective device AG4 cancels its blocked state, and causes the switch S1 to be switched. The processing takes place in a similar way in the outgoer protective device AG5, but in this case the data processing unit 30 for the outgoer protective device 5 does not pass a forward signal to the tripping stage 33, since the data processing unit 30 has identified only a fault in the backward direction. The same applies to the outgoer protective device AG6. It should be mentioned once again at this point that the outgoer protective devices AG4–AG6 need not necessarily each have the starting stage 54, 55 and 56 and the tripping time stage 57, 58 and 59, respectively. These are provided only to improve reliability. The waiting time T2 and the waiting time T1 are adjustable and, in the present case, are chosen such that the waiting time T1 is longer than the waiting time T2. This means that the tripping stage 32 of the outgoer protective device AG4 is actuated by the tripping time stage 57 very much earlier than the actuation of the tripping stage 51 for the section cable protective device SG1 by the protection time stage 53. The waiting times T1 and T2 are chosen such that, if the data communication via the data bus 38 has not taken place correctly, and in the assumed case in which a fault is present on the connected outgoer A1, the tripping stage 32 for the outgoer protective device AG1 causes the switch S1 to opened earlier than the actuation of the tripping stage 51 by the protective time stage 53 for the section cable protective device SG1. The outgoer A1 is thus disconnected by opening the switch S1 before the waiting time T1 in the protection time stage 53 has elapsed. Thus, once the outgoer A1 has been disconnected, the data processing unit 49 for the section cable protective device SG1 no longer identifies any fault on the radial network, so that, after this point in time, it also no longer applies a fault identification signal to the tripping stage 51. Accordingly, once the waiting time has elapsed and the subsequent actuation of the tripping stage 51, the condition of a fault being present in the radial network is no longer satisfied, so that the tripping stage 51 does not initiate any disconnection of the section cable 1. However, the waiting time T1 is chosen to be sufficiently long that "normally", that is to say when the data communication is taking place correctly, the central control device would have disconnected any fault that had occurred much earlier. In this case, it is also necessary to take account of the data transmission times for the signals to be transmitted via the data bus 38.

In other words: since the waiting time T1 is appropriately longer than the waiting time T2, a fault located on an outgoer is thus always initially disconnected by means of the outgoer protective device AG4 to AG6 associated with this outgoer. If the fault is located on the section cable 1 then, in contrast, no disconnection by one of the outgoer protective devices AG4 to AG6 takes place; in this case, the section cable protective device SG1 is disconnected. The choice of the waiting time T2 and of the waiting time T1, together with the outgoer protective devices AG4 to AG6 and the section cable protective device SG1 thus results in time-staggered protection.

The waiting times in the tripping time stages 58 and 59 for the outgoer protective devices AG5 and AG6, which correspond to the waiting time T2 for the tripping time stage 57, may be different to the waiting time T2 for the tripping time stage 57; the waiting times of the tripping time stages 57 to 59 may therefore be different to one another. However, it is necessary to ensure that the waiting times of the tripping time stages 58 and 59 are also in each case correspondingly shorter than the waiting time T1 of the protection time stage 53.

It should be mentioned at this point that a section cable protective device may also be provided for the arrangement shown in FIG. 1. As is illustrated in FIG. 2, this is then connected to the control device 40 and, as described in FIG. 2, detects a fault on the section cable 1 and, as described there, sends a fault identification signal to the control device 40. As is likewise described with reference to FIG. 2, this initiates disconnection of the section cable 1 via the section cable protective device SG1. The section cable protective device SG1 may be designed as required with a starting stage 52 and a protection time stage 53, or else without these stages. In a corresponding way, the outgoer protective devices AG1–AG3 may each be designed with a respective starting stage 54, 55 or 56 and a respective tripping time stage 57, 58 or 59. If both a section cable protective device as provided in the arrangement shown in FIG. 1 and the outgoer protective devices AG1–AG3 are each designed with a corresponding starting stage and with the protection time stage and/or a tripping time stage, then it is possible, as described with reference to FIG. 2, to provide a type of time-staggered protection by appropriate adjustment of the first waiting time T1 and of the second waiting time T2.

A further converter (not illustrated) may also be used, in both arrangements, to provide a feed in each case at the other end 60 of the section cable 1. The other end 60 of the section cable 1 can then be connected to the converter via an additional switch (which is likewise not illustrated). The additional switch may either be actuated together with the switch S0 via the central control device 40, as in the arrangement shown in FIG. 1, and is also switched in the same way as the switch S0. However, an additional section cable protective device, which is identical to the section cable protective device SG1, may then also be provided at the other end 60, and is likewise connected to the central control device 40 and is included in the method, and operates, in the same way as the section cable protective device SG1.

With regard to both arrangements, it should also be noted that the data processing device 41, the tripping unit 42 and the control unit 43 may be combined as required in the central control device 40. The same is also true of the stages which are in each case associated with one of the outgoer protective devices AG1 to AG3 or AG4 to AG6, such as the measurement stage 26, 27, 28, the data processing unit 29, 30, 31, the tripping stage 32, 33, 34, the transmitting/receiving stage 35, 36, 37 and the tripping time stage 57, 58, 59, as well. This also applies for the individual components associated with the section cable protective device SG1, such as the measurement stage 48, the data processing unit 49, the transmitting/receiving stage 50, the tripping stage 51 and the protection time stage 53.

With regard to the outgoer protective devices AG1 to AG6, it should be noted that the respective data processing unit 29, 30, 31 forms a means for detecting the fault direction, in that the corresponding transmitting/receiving stage 35, 36, 37 in each case forms the means for sending the fault direction signal to the central control device 40, and that the corresponding tripping stage 32, 33 or 34, respectively, forms a means for initiating disconnection of the respective associated outgoer A1, A2 or A3. The data processing unit 29, 30 and 31 for the outgoer protective devices AG1 to AG6, in particular the data processing unit 29 for the outgoer protective device AG1, each form a means for identification of a fault on the section cable 1.

With regard to the central control device 40, it should be noted that its data processing device 41 forms a means for determining the faulty outgoer A1, A2, A3 or for determining a fault on the section cable 1, and that the tripping unit 42 forms a means for initiating the disconnection of the section cable 1; the transmitting/receiving stage 39 for the central control device 40 forms a means for sending a tripping signal to the section cable protective device SG1. The tripping stage 42 and the transmitting/receiving stage 39 form means for forming and sending a tripping signal to the section cable protective device and to the outgoer protective devices. The control unit 43 forms a means, which is connected to the converter 2, for its actuation.

With regard to the section cable protective device S1, it should be noted that the transmitting/receiving stage 50 forms a means for sending a fault identification signal to the central control device 40; the data processing unit 49 for the section cable protective device SG1 forms a means for identifying at least a fault on the section cable.

What is claimed is:

1. A method for fault identification in an electrical radial network having a section cable which can be disconnected and to which a number of outgoers can be connected, which are each monitored by an associated outgoer protective device for the occurrence of a fault, comprising:
   connecting each outgoer protective device, which is associated with an outgoer, to the section cable and transmitting at least one fault direction signal to a central control device if the fault is on the section cable or is identified as being on the outgoer;
   sending at least one fault signal to the central control device from at least one of the outgoer protective devices if the fault is on the section cable and all the outgoers are disconnected;
   determining the outgoer which has been identified to be faulty or a fault on the section cable by the central control device which uses the received fault signals and the received fault direction signals; and
   disconnecting the outgoer if it is faulty by the associated outgoer protective device or the section cable by the central control device if a fault on the section cable occurs.

2. The method as claimed in claim 1, wherein
   a fault on the section cable is detected by a section cable protective device which is initially blocked and is provided at a fed end of the section cable, and the section cable protective device sends a fault identification signal to the central control device, and
   when there is a fault on the section cable, the central control device sends a tripping signal to the blocked section cable protective device.

3. The method as claimed in claim 2, wherein following a stimulus to the section cable protective device which initiates the method, the section cable is disconnected after a first waiting time following the stimulus and if the fault is still present, with its own blockade being cancelled.

4. The method as claimed in claim 3, wherein the first waiting time is longer than the second waiting time.

5. The method as claimed in claim 1, wherein the section cable is fed by a converter, and the outgoer protective devices are likewise initially blocked, wherein
   at least if the outgoer is faulty, the central control device drives the converter such that the electrical voltage which is applied to the section cable is regulated at zero, and then
   the central control device sends a tripping signal to the outgoer protective device which is associated with the faulty outgoer.

6. The method as claimed in claim 5, wherein following a stimulus which initiates the method, each outgoer protective device trips after a second waiting time following the stimulus when a fault is identified on the associated outgoer, canceling its own blockade.

7. The method as claimed in claim 1, wherein the section cable is supplied with an operating voltage at a variable operating frequency.

8. The method as claimed in claim 1, wherein the method is applied to a magnetic levitation transport system, with each outgoer being connected to one end of a polyphase linear stator, which is associated with a specific section of the magnetic levitation transport system, with the appropriate outgoer being connected to the section cable for activation of a section, and another end of the linear stator being connected in star.

9. The method as claimed in claim 8, wherein two linear stators which can be activated such that they are considered successively corresponding to a direction of travel of a magnetic levitation transport which is located on the magnetic levitation transport system, are connected to the section cable at a same time by connection of the appropriate outgoers, with only the first of the linear stators to be activated being connected in star.

10. A method for fault identification in an electrical radial network having a section cable which is monitored by a section cable protective device, which is initially blocked, for the occurrence of a fault, and to which a number of outgoers can be connected, which are each monitored by an associated outgoer protective device for the occurrence of a fault, comprising:
   transmitting, by each outgoer protective device which is associated with an outgoer which is connected to the section cable, at least one fault direction signal to a central control device if the fault is on the section cable or is identified as being on the outgoer;
   transmitting, by the section cable protective device, a fault identification signal to the central control device, at least if the fault is on the section cable;
   determining, by the central control device using the received fault identification signals and the received fault direction signals, the outgoer which has been identified to be faulty, or a fault on the section cable; and
   disconnecting an outgoer identified as being faulty by the associated outgoer protective device or, in the event of a fault on the section cable, the central control device sends a tripping signal to the blocked section cable protective device.

11. A device for fault identification in an electrical radial network with a section cable which can be disconnected and to which a number of outgoers can be connected, each of which has an associated outgoer protective device which is connected to a central control device for data transmission, comprising:
   means for detecting a fault direction, in each outgoer protective device, in the event of a fault which is identified on the associated outgoer;
   means for sending a fault direction signal, when the associated outgoer is connected and in the event of a fault occurring on the section cable, to the central control device;

means for initiating disconnection of the associated outgoer;

means for identification of a fault on the section cable when the associated outgoer is disconnected, the means for identification being included in at least one of the outgoer protective devices;

means for sending a fault signal to the central control device;

means in the central control device for determining the outgoer which is identified as being faulty, or determining a fault on the section cable on the basis of the received fault direction signals and received fault signals; and means for initiating the disconnection of the section cable when there is a fault in the section cable.

12. The device as claimed in claim 11, wherein one end of the section cable has an associated section cable protective device, which is connected to the central control device, can be switched to a blocked state and has means for sending a fault identification signal to the central control device in the event of a fault on the section cable, and the central control device has means for producing and sending a tripping signal to the section cable protective device.

13. The device as claimed in claim 12, wherein the section cable protective device has a protection time stage, via which a first waiting time, which runs following a stimulus, is set in order to initiate the disconnection of the section cable when a fault is still present.

14. The device as claimed in claim 13, wherein the first waiting time is set to be longer than the second waiting time.

15. The device as claimed in claim 11, wherein the outgoer protective devices can be switched to a blocked state, and the central control device is in communication with a converter which is provided and is connected to the fed end of the section cable, the central control device has means, which are connected to the converter, in order to drive the central control device, and has means for forming and sending a tripping signal to the outgoer protective devices.

16. The device as claimed in claim 15, wherein each outgoer protective device has a tripping time stage, via which a first waiting time, which runs following a stimulus, is set in order to initiate the disconnection of the associated outgoer when a fault is present.

17. A device for fault identification in an electrical radial network having a section cable which can be switched off and having a fed end with an associated section cable protective device, in which the section cable can be connected to a number of outgoers, each of which has an associated outgoer protective device which is connected to a central control device for data transmission, wherein the section cable protective device can be switched to a blocked state and has means for identification of at least one fault on the section cable, and means for sending a fault identification signal to the central control device, each outgoer protective device has means for detecting the fault direction in the event of a fault occurring on the associated outgoer or in the event of a fault occurring on the section cable when the associated outgoer is connected, and has means for sending a fault direction signal to the central control device, the central control device has means for determining the faulty outgoer or a fault on the section cable on the basis of the received fault direction signals and of the received fault identification signal, and the central control device has means for forming and sending a tripping signal to the section cable protective device.

* * * * *